United States Patent [19]

Sauser, Jr.

[11] Patent Number: 5,654,983

[45] Date of Patent: Aug. 5, 1997

[54] METHOD AND APPARATUS OF OPERATING DATA COMMUNICATIONS EQUIPMENT IN COMMAND MODE AND AUTOBAUDING

[75] Inventor: Martin H. Sauser, Jr., Atlanta, Ga.

[73] Assignee: Hayes Microcomputer Products, Inc., Norcross, Ga.

[21] Appl. No.: 258,342

[22] Filed: Jun. 10, 1994

[51] Int. Cl.$^6$ .................... H04B 3/46; H04L 7/00
[52] U.S. Cl. .................... 375/225; 375/354; 375/365
[58] Field of Search .................... 375/222, 354, 375/219, 268, 269, 220, 221, 356, 377, 225, 340, 345, 357, 365, 366, 360, 355; 364/900, 166; 370/84, 100.1, 105.4, 106, 465

[56] References Cited

U.S. PATENT DOCUMENTS

| | | | |
|---|---|---|---|
| 4,549,302 | 10/1985 | Heatherington | 375/222 |
| 4,686,690 | 8/1987 | Sato | 375/365 |
| 4,716,562 | 12/1987 | Carse et al. | 370/93 |
| 4,783,995 | 11/1988 | Michel et al. | 73/151 |
| 5,008,902 | 4/1991 | Key et al. | 375/225 |
| 5,054,020 | 10/1991 | Meagho | 370/48 |
| 5,222,081 | 6/1993 | Lewis et al. | 375/369 |
| 5,301,274 | 4/1994 | Li | 395/250 |
| 5,365,547 | 11/1994 | Marinaro | 375/259 |

Primary Examiner—Wellington Chin
Assistant Examiner—William Luther
Attorney, Agent, or Firm—Jones & Askew

[57] ABSTRACT

A modem (20) receiving high speed digital data from data terminal equipment (10). The modem operates in a "software UART" state when in command mode. A high speed clock (30) is used to continually take samples of an incoming signal from a DTE (10). A microprocessor (40) multitasks between analyzing the samples taken from the incoming signal and generating output signals to be sent to the DTE (10). The high speed clock is adjustable, setting the sample rate to be a integer multiple of at least eight times all the possible bit rates of the incoming signal. This permits quicker autobauding. Commands and prefixes can be received and detected simultaneously with the transmission of result codes to previous commands.

4 Claims, 3 Drawing Sheets

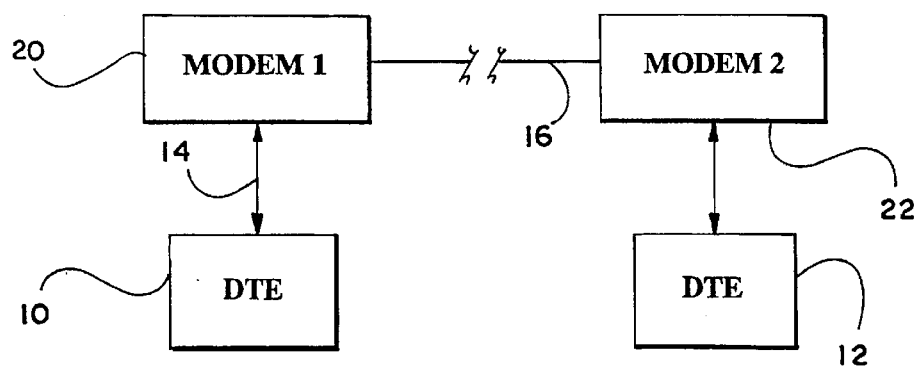
Fig_1
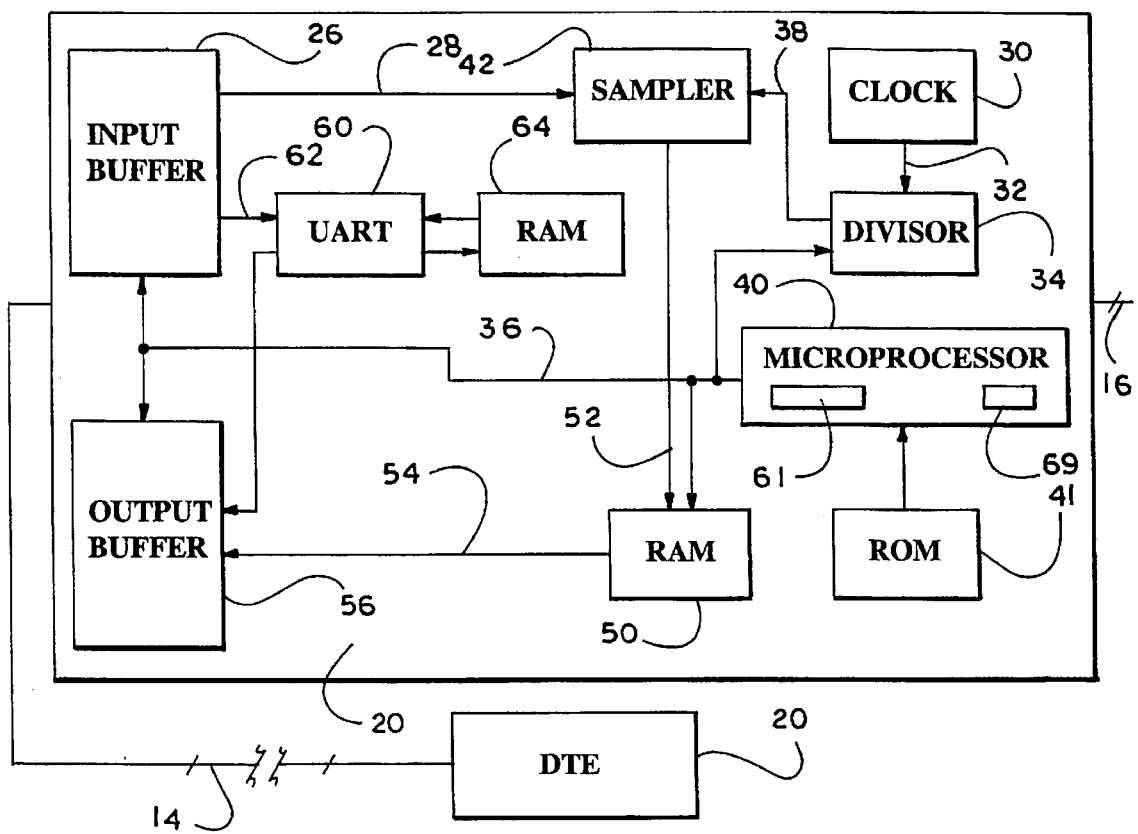
Fig_3

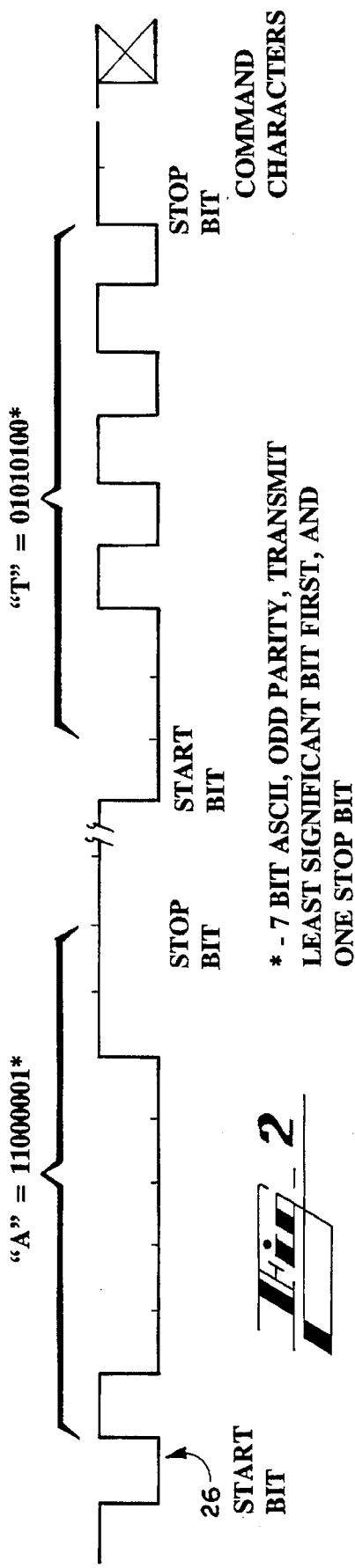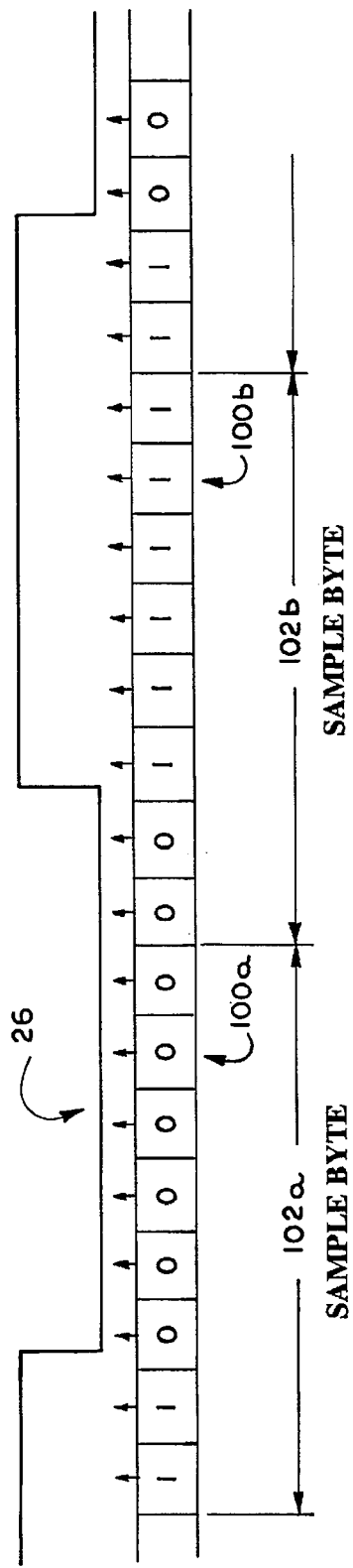

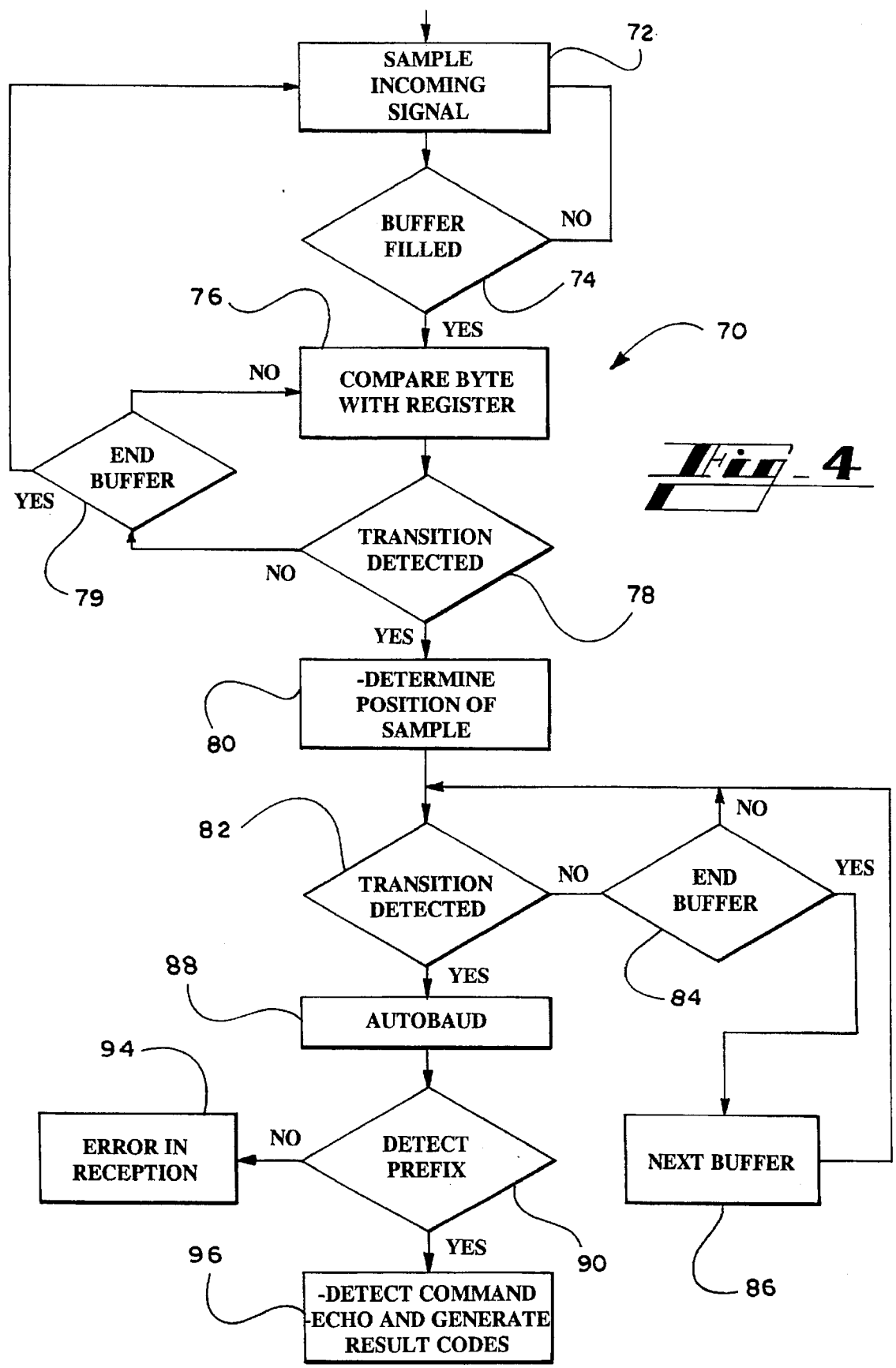

METHOD AND APPARATUS OF OPERATING DATA COMMUNICATIONS EQUIPMENT IN COMMAND MODE AND AUTOBAUDING

TECHNICAL FIELD

The present invention is an improved method for responding to high speed commands in data communication equipment and, more specifically, is a method for rapidly and automatically determining the baud rate of an incoming digital signal (autobauding) in devices receiving digital data at varying speeds.

BACKGROUND OF THE INVENTION

In current data communications systems, asynchronous, serial digital data is generated at data terminal devices, generally called data terminal equipment (DTE). Typically, the DTE is a personal computer (PC), such as those made by International Bushess Machines Corp. or Apple Computer, Inc., or the like. The DTEs are versatile devices that can communicate digital signals at a plurality of speeds, including relatively high speeds. For example, current bit rates include 14,400 bits per second (14.4K bps), 19.2K bps, 28.8K bps, and 57.6K bps. Furthermore, 115.2K bps and 230.2K bps are two communication speeds that will be more widely utilized in the near future. These bit rates greatly exceed the commonly used data communication speeds of just a few years ago.

DTEs often communicate with each other over the public switched telephone network. Each DTE is connected to the telephone network through data communication equipment (DCE). Typically, the DCE will be a modulator/demodulator device, commonly known as a modem.

As is familiar to those skilled in the art, the application program running on the DTE will establish the bit rate of digital data transmitted to the modem. Modems must be capable of receiving data and/or command signals from the DTE at any of a number of bit rates. Therefore, the modem must automatically recognize and adjust to the bit rate of the digital signals being emitted by the DTE.

The name given to the process of analyzing and determining the bit rate of a signal provided from a DTE to a modem is "autobauding." By convention, autobauding is performed only when a modem is in command mode. As is familiar to those skilled in the art, When a modem is in command mode, binary data entering the modem is interpreted as commands to perform certain functions.

Most modern intelligent modems have adopted some form of the AT command set that was developed by the assignee of the present invention. The format of the AT command set is that each command includes the prefix characters "AT" and is terminated by carriage return. If the text line therebetween is recognizable the modem received a valid command, the command is executed by the modem and an appropriate affirmative result code is returned. If the command is unrecognized or invalid, it is ignored and a result code indicating that the command is unexecutable is returned to the data terminal equipment. The modem analyzes the "AT" prefix characters to determine the bit rate of and lock onto the incoming digital data.

More specifically, in the American Standard Code for Information Interchange ("ASCII"), one of many standards for encoding characters in bits, the character "A" is equal to a hexadecimal 41 and the character "T" is equal to hexadecimal 54. Thus, the modem will autobaud when it receives a hexadecimal 41 followed by a hexadecimal 54. In seven bit ASCII code, the bits for these characters are, respectively, 1000001 and 1010100. The format for seven bit ASCII often calls for the use of parity, start and stop bits. The parity bit is set to binary 1 or 0 so that the total number of ones that occur in the resultant eight bit string is always even (even parity) or always odd (odd parity). The parity bit functions as error detection if an odd number of bits in the character is/are flipped during transmission, because the predetermined parity (even or odd) will not be matched by the parity of the character. The eight bit, odd parity "AT" characters are 11000001 and 01010100, respectively.

Typically, the characters will also be framed by one (or more) start and stop bit(s). Before transmission or between characters the data line is usually held high or marking. A start bit of 0 marks the beginning of a character. The communication protocol discussed in the specification includes seven bit character and one parity bit that follow a start bit although the character could be 5, 6, or 8 bits, the parity bit is optional, and other communication protocols could be utilized. For example, one bit stop bit follows the parity bit in the protocol set forth herein, although the stop bit could be 1½or 2 bits. The stop bit is a logical one or mark condition. The character length, parity, start, and stop bit parameters are agreed upon before data communications between the two modems in a manner familiar to those skilled in the art.

By analyzing the characteristics of the "AT" prefix, a receiving modem can determine the bit timing, character format and parity indication, if any, of the transmitting DTE. In modems manufactured by Hayes Microcomputer Products, Inc. ("Hayes") the originator of the AT command set, the bit rate and character format are determined from each AT prefix that is transmitted from the DTE, and this information is used for character formatting for the balance of the characters that follow the AT prefix.

The above discussion concerns receiving and interpreting commands. Many modems sold today utilize the 68302 CMOS microprocessor and UART chip sold by Motorola Corporation (Schaumburg, Ill.) to receive commands, and to autobaud. Generally stated, when operating in command mode, today's "intelligent" modem using a Motorola Corporation 68302 microprocessor has two internal states of operation: "UART state" and "hardware echo state."

In the UART state, all incoming signals from the DTE are treated as commands. This ability to load and respond to commands is what makes the modem intelligent. The bits in the command characters are serially loaded into a universal asynchronous receiver/transmitter "UART") device, (hence the name "UART state") and then sent in parallel to random access memory (RAM) associated with the microprocessor. The microprocessor analyzes the bytes to determine what command is being sent. The microprocessor acts upon the command, and sends the appropriate response to the DTE through the UART.

Alternatively, the modem operates in the hardware echo state. In the hardware echo state, the incoming command signals are shunted back as output to the DTE. The DTE expects to see an echo of its output signal coming from the modem up to and through receipt of the "AT" prefix. Thus, modems typically will remain in the hardware echo state before receipt of the "AT" characters, and throughout at least part of the "AT" pattern.

When operating in the hardware echo state, modems have a fast pulse clock that is used to sample the incoming data stream during autobanding. The number of samples taken during a bit or bits on the incoming signal during the "AT"

character pattern is used to calculate the speed of the incoming signal. For example, the modem may analyze the start bit preceding the "A" character. In modems sold by Hayes, the assignee of the present invention, the modem counts the number of samples it obtains during the start bit, and uses that number to calculate the speed of the incoming signals. Thus, if the modem takes one million samples per second (the clock runs at 1 mHz), and one-hundred samples are taken during the start bit, the incoming signal has a calculated bit rate of 10K bps [(1 mHz/100 samples)=10K bps]. Likewise, if fifty samples are taken during the start bit, the calculated bit rate of the incoming signal is 20K bps [1 mHz/50 samples)=20K bps]. Samples from several bits in the "AT" prefix may be taken to ensure that the calculated bit rate is accurate. In existing modems, the bit rate is either calculated directly from the total number of samples counted during the star bit, or the sample count is compared to a table that associates the sample counts with common bit rates for data signals. In the latter case, the modem is set to operate at the bit rate in the table that is closest to the calculated bit rate. Thus, the modem "autobauds" to the bit rate of the incoming signal.

Generally speaking, in intelligent modems sold today, after uncovering a pattern of bits that match the "AT" pattern, or even a portion of the pattern, the modems switch into the UART state of operation. The modems switch into the UART state to receive and echo the command characters back to the DTE. Specifically, the received character sequence may be "ATSO=1<CR>", where <CR> is a carriage return. The character sequence of "ATSO=1<CR>" is echoed back to the DTE followed by a result code. The signals sent to the DTE indicate that autobauding has successfully occurred.

More specifically described, the UART assembles the incoming signal into bytes and provides the bytes to the microprocessor for analysis. The microprocessor determines the type of command it is receiving and outputs the appropriate response. Typically, the modem is in hardware echo state as it echoes at least part of the "AT" characters, and switches to the UART state to interpret and echo the remainder of the "AT" prefix and the "S0=1<CR>" characters. The result code is generated by the microprocessor and passed to the DTE through the UART. The UART provides the necessary data formatting, such as a start and stop bit, for each character of the result code. The characters sent from the modem to the DTE thus include the echoed command signals, including the AT prefix and the <CR> suffix, plus a predetermined response to acknowledge receipt of the command.

In currently available modems, providing result codes to the DTE while accepting incoming command signals from the DTE is often not possible at high speeds. For example, consider the common situation where the incoming signal contains two contiguous command signals for the modem. The modem will accept the first "AT" pattern and enter the UART state of operation to accept the command characters that are expected to be received after the "AT" prefix. The modem will need to echo the AT prefix, the command characters, and <CR> suffix, as well as to transfer result codes to the DTE to acknowledge receipt of the first command. However, at the same time the result codes are being sent, the DTE may be transmitting the "AT" pattern of the second command in the sequence. The modem cannot autobaud on the second "AT" pattern when it is in the UART state of operation and transmitting the result code. Thus, an incoming command may be completely missed and communications may fail.

A fundamental autobauding problem with prior art modems is the repetitive transition between the hardware echo state and the UART state. The modems will only autobaud in the hardware echo state of operation because existing devices, such as the 68302 microprocessor and UART chip, are incapable of autobauding in the UART state of operation. Likewise, the modem can only transmit result codes in the UART state of operation because, in the hardware echo state the modem only reflects data to the DTE and cannot generate the necessary result codes. Therefore, at very high incoming signal speeds the modem may not be able to switch between states quickly enough to respond to the various incoming signals.

Another aspect of autobauding in existing modems is the significant mount of microprocessor time consumed searching among the voluminous number of samples taken to find the center sample of each incoming bit. Specifically, when operating in the hardware echo state, modems today typically calculate the bit length of the incoming dam and then laboriously count a calculated number of samples to move from one center sample to the next. This requires significant devotion of the microprocessor time to one task.

Therefore, there is a need for a method and apparatus for autobauding that does not require that the modem switch between modes of operation when receiving commands.

Furthermore, there is a need for a method and apparatus that autobauds and detects incoming bits with less devotion of the microprocessor.

Furthermore, there is a need for a method and apparatus for autobanding at high speeds.

SUMMARY OF THE INVENTION

The present invention provides a method and apparatus for autobauding at very high speeds and of keeping the modem in one state throughout the command mode to avoid missing or erroneously interpreting commands. Furthermore, the present invention provides a method for simultaneously receiving autobauding command characters and transmitting response signals to the DTE.

In the preferred embodiment of the present invention, the DCE is a modem connected to a digital computer, the DTE. In the present invention, the modem has a third state of operation called software UART state. Thus, in the present invention, a third alternative has been added to the conventional two states of operation in modems (hardware echo and hardware UART).

The modem remains in the software UART state throughout the command mode in the preferred embodiment of the present invention. While operating in the software UART state, the modem performs autobauding on received prefixes, accepts command characters, and simultaneously transmits echoed characters and result codes.

As will be familiar to those skilled in the art, the DTE sets the modem in command mode to receive the AT prefix, command characters, and <CR> suffix. Those skilled in the art will recognize how a modem may be set to command mode. In the preferred embodiment of the present invention, the modem is put in command mode upon power up, or after receiving an escape sequence with appropriate guard times, such as is set forth in U.S. Pat. No. 4,549,302, assigned to the assignee of the present invention. In command mode, all signals from the DTE are interpreted by the modem as being part of commands. Thus, the command signals are not modulated by the modem onto the communications line. Therefore, it should be recognized that autobauding in the present invention involves operation of the modem in the command mode.

In the software UART state, a very high frequency clock is used to take samples from the incoming signal. These samples are formed into bytes that are stored in a plurality of buffers. A microprocessor (sometimes referred to as a processor or microcontroller) running a program monitors the samples of the incoming signal. If the incoming signal is just a marking condition, the microprocessor will simply output the samples being stored in the memory buffers back to the DTE. The samples are played back out to the DTE to simulate the incoming signal, thereby acting as the modem would be expected to act in the hardware echo state when no signals are being received.

The microprocessor monitors the samples to detect the beginning of an "AT" character pattern at the modem. The present invention detects the duration of the start bit for the first bit in the "AT" pattern because the duration of the start bit is indicative of the bit rate of the incoming signal. An eight bit mask containing all "1"s is compared with each byte of samples that is stored in the buffers. The occurrence of a transition to "0" associated with a start bit on a line in communications path into the modem is detected by the comparing process.

The microprocessor then analyzes samples received subsequent to the transition associated with the beginning of the start bit to find another transition that marks the end of the start bit. Specifically, the microprocessor compares a mask containing all "0"s with each byte of samples to find a transition to "1" associated with the end of the start bit and beginning of the least significant bit of the "A" character.

After determining which samples contain the beginning and end of the start bit, the microprocessor calculates the bit rate of the incoming signal ("autobauds"). Specifically, the processor totals the number of samples taken during the start bit and calculates the duration of the start bit based thereon.

Once the bit rate of the incoming signal is known, the modem detects subsequently received bits by reading the "center sample" in each bit in the incoming signal stream. The location of the center sample in each incoming data bit is known because the center sample of the start bit and the length of each bit are known. Thus, the processor continues to monitor the center samples of each incoming bit until detecting the stop bit for the "T" character. The "AT" prefix is thereby recognized.

Additionally, while receiving the "AT" prefix, the modem continues to route the samples of the incoming signal to an output buffer connected to the DTE. Thus, as expected, the DTE receives a reflection of the signal that it transmitted to the modem.

As stated above, after receiving an "AT" prefix, the modem will expect to receive command characters and a suffix. The microprocessor receives the command while remaining in the software UART state. The microprocessor continues to monitor the center samples of each bit in the incoming signal to detect the command characters following the "AT" prefix, as well as to echo the samples of the command characters. The microprocessor detects the command characters and performs as commanded.

A result code must be sent from the modem to the DTE to acknowledge receipt of the command. The bit patterns necessary to produce the result code are generated by the microprocessor. The microprocessor generated result code is transmitted to the DTE through an output buffer.

Simultaneously with the result code being sent from the modem to the DTE, the DTE may begin to send a new command sequence to the modem. In the present invention, the microprocessor multitasks within the software UART state between monitoring the incoming signal to detect and echo the AT prefix and command characters and generating and sending result codes, as discussed above.

Significantly, the samples taken of the incoming signal in the software UART state are taken at a rate equal to an integer multiple of eight times all possible bit rates of the incoming signal. Because the present invention samples the incoming signal at an integer multiple of eight times all possible bit rates, the center sample of all bits are an integer number of bytes apart. Therefore, unlike earlier autobaud systems that must count samples to move between center samples of bits, the present invention merely moves a predetermined number of bytes to go from one center sample to the next center sample. By stepping through samples in byte increments, significantly less microprocessor time is consumed to locate the center samples of incoming data bits.

Thus, it is an object of the present invention to provide a modem that does not need to shift between states of operation when receiving command signals from a DTE and generating response signals to be transmitted from the modem to a DTE.

More specifically, it is an object of the present invention to provide a modem that can simultaneously send result codes to the DTE and receive the AT autobauding prefix from the DTE.

It is another object of the present invention to provide a modem that optimizes the speed at which autobauding is performed.

It is a further object of the present invention to adjust the sample clock to be an integer multiple of eight times all of the possible bit rates of the incoming signal.

That the present invention accomplishes these objects and overcomes the above cited drawbacks of the prior art will be apparent to those skilled in the art from the detailed description in the preferred embodiment to follow.

BRIEF DESCRIPTION OF DRAWINGS

FIG. 1 is a block that illustrates a data communications application employing the preferred autobauding method and apparatus of the present invention.

FIG. 2 is a timing diagram of a typical command, including the "AT" characters upon which autobauding is performed, sent from a computer to a modem in the preferred embodiment of the present invention.

FIG. 3 is a block diagram of a microprocessor based circuit for implementing the preferred embodiment of the present invention in a modem.

FIG. 4 is a flow chart of the steps taken by the microprocessor in carrying out the preferred embodiment of the present invention.

FIG. 5 is a timing diagram for the preferred embodiment of the present invention.

DETAILED DESCRIPTION OF DRAWINGS

Turning next to the drawings in which like numerals indicate like parts, the preferred embodiment of the present invention will now be described. FIG. 1 is a schematic that illustrates a data communications application employing the preferred autobauding method and apparatus of the present invention. In the preferred embodiment of the present invention, the data terminal device, generally called data terminal equipment (DTE) 10, is a personal computer (PC) such as are made by International Business Machines Corp.

and Apple Computer, Inc., or the like, although virtually any computer or other source of digital data may be utilized in the present invention. The DTE 10 is a source of high speed serial digital data provided to the data communications equipment (DCE), which is a modem 20 in the preferred embodiment of the present invention. As is familiar to those skilled in the art, the modem 20 modulates and demodulates signals on the communications line 16 and communicates with other DCEs 22 (modems) and DTEs 12.

The preferred embodiment of the present invention is implemented in modem 20. When in the command mode, the modem employs the AT command set so that the AT prefix is expected before virtually every command, and the serial bits of these characters are used in the autobauding process in the preferred embodiment. However, the present invention is not so limited and, those skilled in the art will recognize that the DCE may be any data communication equipment wherein the bit rate of the incoming digital data signal must be determined. Those skilled in the art will recognize that the preferred embodiment will operate in any device receiving digital data at one of a plurality of different speeds, wherein the possible different speeds are known.

The DTE 10 communicates high speed digital data to the modem 20 over communications path 14. In the preferred embodiment of the present invention, the communications path 14 comprises a standard RS-232 connection, known to those skilled in the art, although other connections, communication protocols and/or standards may be used.

In the preferred embodiment, the DTE 10 can provide digital data to the modem 20 at one of a predetermined variety of speeds, including a bit rate in one of the three sets of Speed Groups shown in Table I below:

TABLE 1

| Speed Group | Speeds |
| --- | --- |
| 1 | 300, 1200, 2400, 4800, 7200, 9600, 14400, 19200, 28800, 38400, 57600, 115200, and 230400 bps (bits per second). |
| 2 | 300, 1200, 2400, 4800, 9600, 20800, 41600, and 62400 bps. |
| 3 | 300, 1200, 2400, 4800, 9600, 19200, 38400, and 51200 bps. |

Typically, the communication speeds set forth in Speed Group 1 are used in the United States of America, while Speed Groups 2 and 3 contain communication speeds common in Japan.

The DTE 10 and modem 20 are set to operate in one of the Speed Groups in Table 1. Thus, if a modem 20 was operating at speeds in Group 1, the modem 20 would not expect to receive digital data at a bit rate of 41600 bps, a bit rate that is not in Group 1.

Typically, a switch on the modem 20 sets the modem to operate in one of the three speed groups. The modem 20 may have a manually adjusted switch (not shown) or the DTE 10 may send a command to the modem 20 over communications path 14 that sets the modem to operate in one of the Speed Groups in Table 1.

Thus, the modem 20 is set to one of the Speed Groups in Table 1. The bit rate of signals arriving at the modem 20 are therefore limited to the rates in the chosen group. The modem 20 may be switched between bit rates in the chosen Speed Group in reaction to commands from the DTE 10 by autobauding.

By convention of the AT command set, autobauding in modem 20 is performed upon receipt of the character "A" followed by receipt of the character "T". The AT prefix per se is not a command, but it will cause the modem 20 to perform autobauding and adjust the speed at its data input port. Command characters follow the "AT" prefix. The autobauding prefix and command characters are shown in FIG. 2, wherein the data is communicated in 7-bit ASCII using 1 parity bit (odd parity). The "A" and "T" characters are transmitted least significant bit first, as will be familiar to those skilled in the art. Thus, when the modem 20 receives an "A" followed by a "T", the modem 20 will detect the speed at which the two characters were transmitted and will begin operating at that speed (the modem autobauds).

Furthermore, by convention, virtually every command sent from the DTE 10 to the modem 20 is preceded by the "AT" prefix. Thus, modems autobaud before every command received from the DTE 10. Command characters, such as for a command to initiate a call, will follow the sequence of "AT" characters. These command characters are detected and interpreted in the modem 20.

FIG. 3 is a block diagram of a microprocessor based circuit for implementing the preferred embodiment of the present invention in a modem 20. FIG. 4 is a flow chart of the steps in a computer program 70 taken by the microprocessor 40 in carrying out the preferred embodiment of the present invention. The microprocessor 40 is preferably part of a Motorola Corporation 68302 microprocessor and UART integrated circuit chip, although other microprocessors may be utilized. However, the 68302 chip includes the microprocessor 40, the UART 60, the dual-port random access memory (RAM) 64, the sampler 42, and the divisor 34 on one chip or device (FIG. 3). Thus, the 68302 chip includes many components needed for the preferred embodiment. The program 70 used to carry out the preferred embodiment of the present invention is loaded into read-only-memory (ROM) 41 (FIG. 3). Referring to FIGS. 3 and 4, the operation of the preferred embodiment is described in detail.

The modem 20 is switched between command and on-line modes in a manner familiar to those skilled in the art. Specifically, the DTE 10 sends an escape sequence with guard time to the modem 20 to indicate that the DTE 10 is switching from transmitting data (on-line mode) to transmitting commands (command mode), or sends an enter on-line mode command to indicate that the DTE is switching from transmitting commands (command mode) to transmitting data (on-line mode).

In the preferred embodiment, instead of switching to the command mode common to the 68302, the modem 20 switches to execution of the program 70 by the microprocessor 40 upon receiving the escape sequence with guard time. Because the program 70 is executed in command mode in the preferred embodiment, certain preprogrammed software (not shown) in the 68302 chip that usually is executed in command mode is not executed. This software for the 68302 chip is overridden by execution of program 70, which receives and interprets commands in the software UART state.

Referring to FIG. 3, an input buffer 26 and an output buffer 56 serve as the interface between the modem 20 and the communications path 14 that connects to the DTE 10 (FIG. 3). The microprocessor 40 provides control signals on control and data bus 36 to control the input buffer 26 and the output buffer 56. The input buffer 26 squares-up the incoming data signals and routes the incoming signal under control of the microprocessor 40 in a manner familiar to those skilled in the art. Specifically, the input buffer 26 routes the incoming data signals to either the sampler circuit 42 on line 28 or to the UART 60 on line 62. In the preferred embodiment, the input buffer 26 passes the incoming signal to the sampler circuit 42 when the modem 20 is in command mode (receiving commands) and passes the incoming signal to the UART 60 when the modem is in on-line mode (communicating data), as will be more fully explained below.

As will be recognized by those skilled in the art, the input buffer 26 could be controlled to transfer incoming signals directly to the output buffer 56 in a hardware echo state. However, this is unnecessary because the preferred embodiment of the present invention autobauds in the software UART state embodied by execution of the computer program 70 (FIG. 4) rather than hardware echo state, rendering the hardware echo state and hardware UART states unnecessary in the present invention.

As will be familiar to those skilled in the art, autobauding only occurs when a modem 20 is in command mode. In the preferred embodiment, the modem 20 is disclosed operating in the command mode. In command mode, the microprocessor 40 sets the input buffer 26 to provide the incoming signal to the sampler circuit 42.

The incoming signal is passed to the sampler circuit 42 from input buffer 26 via line 28. A divided down sample clock on line 38 generated by a fast clock 30 is fed into sampler circuit 42. The sampler circuit 42 includes a shift register that clocks in the incoming signal on line 28 using the sample clock signal on line 38, thereby producing samples of the incoming signal. The samples of the incoming signal taken by sampler circuit 42 are converted to parallel and passed to random access memory 50 via bus 52. The microprocessor 40 controls writing of the samples from the sampler circuit 42 to the RAM 50. The random access memory 50 includes eight 512×8 buffers in the preferred embodiment of the present invention. Those skilled in the art will recognize that other memory devices, configurations, and sizes may be utilized to store samples of the incoming signal. Furthermore, the RAM 64 and RAM 50 could be one physical RAM chip, a single block of memory, or other memory device/configuration.

The fast clock 30 in the modem 20 generates the sample clock signal that appears on line 38 and is provided to the sampler circuit 42. The sample clock signal may alternately be obtained from the system clock in the DCE 20. Alternatively a dedicated high-speed crystal oscillator clock familiar to those skilled in the art could be embedded in the preferred embodiment.

The clock signal on line 32 provided by clock 30 is divided down by a counter/divisor circuit 34. The divisor circuit 34 accepts the clock signal on line 32 and, using a preset count provided the divisor circuit from the microprocessor 40 via bus 36, outputs the sample clock signal on line 38. The clock signal on line 38 is an integer multiple of eight times all possible bit rates of the incoming signal. As an example, consider that the possible bit rates are in Speed Group I. In the preferred embodiment, the sample clock speed is set to eight times the fastest bit rate in Speed Group 1 (230.4K bps). As the highest expected bit rate in Speed Group 1 is 230.4K bps, the sample clock bit rate is set to 1,843.2 Khz.

Because the rate of the sample clock signal on line 38 is always set to an integer multiple of eight times all the possible data speeds in the selected group in Table 1, the below formula is used:

$$\text{Sample Rate} = 8N \times (BR)$$

where N=any integer 1, 2 . . . , and BR=any potential bit rate in the selected Speed Group.

Therefore, when operating with the Speed Groups in Table 1, the sample clock signal on line 38 is set to a minimum of:

Speed Group 1- 230.4×8=1,843.2 Khz (eight times the fastest bit rate)

Speed Group 2 - 62.4×16=998.4 Khz (sixteen times the fastest bit rate)

Speed Group 3 - 51.2×24=1,228.8 Khz (twenty-four times the fastest bit rate)

The sample clock signal is sixteen and twenty-four times the fastest bit rate in Speed Groups 2 and 3, respectively. These rates are chosen to ensure that the sample clock signal is an integer multiple of eight times all possible bit rates of the incoming signal. If, for example, the sample clock signal for Speed Group 3 was set to eight times the fastest bit rate, it would not be an integer multiple of eight times all possible bit rates of the incoming signal, specifically when the incoming signal has a bit rate of 38400 bps.

The sample clock signal may be set to a faster rate other than those set forth above, as long as the rate is an integer multiple of eight times all the possible bit rates of the incoming signal. Furthermore, the speed groups in Table 1 are common standards, but other speed groups may be created and utilized in the present invention and the rate of the sample clock signal can be adjusted to correspond to any rates by changing the value the microprocessor 40 loads into the divisor 34. The importance of having the sample clock signal be an integer multiple of eight times all the possible bit rates of the incoming signal is explained below.

Referring to FIG. 4, the step 72 in program 70 includes taking samples of the incoming signal and storing the samples as bytes in RAM 50, as discussed above (FIG. 4). RAM 50 is actually subdivided into eight 512×8 buffers 50a–h. Although shown as a discrete step in the program 70 in FIG. 4, the sampling of the incoming signal continually occurs as long as the modem 20 is in the software UART state, and the modem 20 remains in the software UART state as long as the modem 20 remains in command mode in the present invention. In other words, the incoming signal is continually sampled throughout steps 74–96 of FIG. 4, because the modem 20 remains in the software UART state of operation until it exits command mode. The microprocessor 40 performs its analysis of the incoming signals, as set forth at steps 76–96, after every time one of the buffers 50a–h is filled with samples. Thus, while the microprocessor 40 performs steps 74–96 in FIG. 4, samples from the incoming signal currently being received will fill the next available buffer 50a–h.

At step 74, the microprocessor 40 is interrupted if one of the buffers in RAM 50 has been filled. If a buffer 50a–h is not yet filled, the gathering and storing of samples continues. After one of the buffers 50a–h is filled with samples, the RAM 50 interrupts the microprocessor 40 in a manner familiar to those skilled in the art and the microprocessor 40 goes to step 76. At step 76, each byte stored in the most-recently filled buffer, which is presumed to be buffer 50a for purposes of this explanation, is compared with the mask in register 61. At this point the register 61 contains a mask of all "1"s. The microprocessor 40 consecutively compares each byte in the most-recently filled buffer 50a with the contents of register 61 to find a transition in the incoming signal that indicates that the beginning of the start bit 26 has been received.

As can be seen in FIG. 2, the lowering of the marking condition to begin the start bit 26 is the first signal in the command sequence that is received by the modem 20. The start bit 26 is sampled along with the rest of the incoming signal, and stored in the buffers 50a–h. Presume that buffer 50a is receiving the samples when the high to low transition at the front edge of the start bit 26 is received in the modem 20. The detection of the first "0" in a sample stored in buffer 50a indicates receipt of the beginning of the start bit 26. The transition to "0" associated with the beginning of the start bit is detected at step 78 by comparing the "1"s in register 61 with each of the bytes in the buffer 50a. The accumulator (not shown) in microprocessor 40 will detect the first "0" resulting from comparing register 61 with the sample that is a "0" (beginning of the start bit).

Thus, the microprocessor 40 compares the register 61 with each consecutive byte in buffer 50a. After each byte in buffer 50a is compared with register 61, if no transition associated with the beginning of a start bit is detected at step 78, the microprocessor 40 determines if the end of the buffer 50a has been reached at step 79. If the answer to step 79 is "no", meaning that the end of the buffer 50a has not been reached, the program compares the next byte of samples stored in buffer 50a with register 61 looking for the transition associated with the beginning of the start bit 26. However, if a transition is not found before the end of the buffer 50a is reached, as determined at step 79, the program goes to step 72 to await the filling of another one of the buffers 50b–h with samples.

After detecting the beginning of the start bit 26 (FIG. 2) in the samples in buffer 50a at step 78, step 80 is executed. Thus, as a result of a "yes" at step 78, based upon detecting a transition, the microprocessor 40 determines the position of the sample containing the transition at step 80. Specifically, at step 80 the processor 40 determines at which bit position (1–8) in an eight bit byte the transition was detected. For example, the first sample with a "0" value, associated with the beginning of start bit 26, may be detected in bit position three of an eight bit byte in buffer 50a. This is easily detected at step 80 because all the sample bits compared with register 61 before bit position three are "1"s. However, the "0" sample taken at the beginning of the start bit 26 is compared with the "1" in bit position three of register 61. This "0" is detected at step 78 and the bit position of the sample having the transition is noted at step 80. For purposes of the present discussion, we assume that the transition associated with the beginning of the start bit is detected at bit position three of one of the eight bit bytes in buffer 50a. After determining the bit position of the sample marking the beginning of the start bit 26, the microprocessor 40 proceeds to step 82 in program 70.

At step 82, the processor 40 searches the buffer 50a for the second transition from a "0" to a "1" that marks receipt of the end of the start bit 26 (FIG. 2). The transition from a "0" to a "1" associated with the end of the start bit 26 is detected by comparing the samples with the mask in register 61 (FIG. 3), as was done to find the beginning of the start bit 26. The transition marking the end of the start is detected at step 82, and the "yes" branch is followed to step 88 (FIG. 4).

At step 88, the bit rate of the incoming signal is calculated based upon the total number of samples taken during the start bit 26 and the rate of the clock on line 38. The modem 20 takes samples at a known rate on line 38, as was set forth above. Therefore, the number of samples taken during the start bit 26 is used to determine the bit rate of the incoming signal according to the formula: Bit Rate=(Sample Rate/No. of Samples). For example, if the modem 20 is set to Speed Group I, the sample clock is running at 1,843.2 Khz, and thirty-two samples are taken during the start bit 26, the bit rate of the incoming signal is calculated to be (1,843.2/32) =57.6K bps. In the preferred embodiment, the bit rate is determined by comparing the number of samples taken to a table in ROM 41. The table, for example, associates a baud rate (autobaud) of 57.6K bps with the incoming signal when the number of samples detected is within a predetermined range. Thus, a calculated bit rate based on the number of samples taken is associated with the nearest allowable bit rate in the table in ROM 41. This allows for deviation in the number of samples detected during the start bit, rather than relying on precisely calcuhting the bit rate.

To summarize the process for autobauding, the sample clock signal on line 38 is set to an integer multiple of eight times every possible bit rate of the incoming signal. For example, the sample clock can be adjusted to sixteen, twenty-four, thirty-two, etc., times the highest expected incoming bit rate as long as it is an integer multiple of eight times all possible bit rates of the incoming signal. The rate of the sample clock signal is used to calculate the bit rate (autobaud) after the bit positions of the sample that contains the transition associated with the start and end of the start bit 26 are detected.

After the end of the start bit 26 is detected at step 82, the program 70 proceeds to autobaud at step 88. The number of samples taken during the start bit 26 indicates the bit rate of the incoming signal. The bit rate of the incoming signal is calculated using the following formula:

calculated bit rate=(sample clock rate)/(# of samples taken during the start bit).

The modem 20 may operate at this calculated bit rate, but preferably will compare the number of samples to a table of allowable bit rates stored in ROM 41 (or other memory device) and adjust to receive incoming data from the DTE 10 at the bit rate in the table that is most closely correlated to the number of samples.

As will be apparent, the samples taken during the start bit 26 may be spread over several of the buffers 50a–h. If the transition marking the end of the start bit 26 is not detected at step 82, the program 70 goes to step 84. At step 84, the microprocessor 40 determines if the end of a buffer has been reached without finding the end of the start bit 26. If the end of one of the buffers 50a–h is reached without detecting the end of the start bit at step 84, following the "yes" branch the next buffer full of received characters is located at step 86. The program 70 then goes back to step 82 and continues looking at the bit locations in this next buffer 50a–h that might contain the transition marking the end of the start bit (FIG. 4). On the other hand, if the end of the buffer has not been reached at step 84, following the "no" branch the microprocessor 40 simply continues to analyze samples in the buffer at step 82 to find the transition marking the end of the start bit 26.

Those skilled in the art will recognize that the autobauding prefix need not be the "AT" characters. The autobauding prefix may be any predetermined characters. In this case, the bit following the start bit 26 may be a logical "0." For example, the autobauding character following the start bit may be, in binary, "01011010." In that case, there will not be a transition to a logical "1" associated with the end of the start bit 26. Instead, the transition will occur after the least significant bit, which is a "0." Because the autobauding character is known, autobauding is still performed. Specifically, the transition associated with the beginning of the second most significant bit is detected, as is set forth above in detecting the end of the start bit 26. The microprocessor 40 will count the total number of samples taken during the start bit and the least significant bit and divide that total by two. Thus, the total number of samples during the start bit 26 is calculated.

After autobauding is successfully completed at step 88, at step 90, the microprocessor 40 detects the remainder of the bits in the "AT" prefix that follow the start bit 26 (FIG. 2). Because communication is asynchronous, the start of each character must be independently determined. The start bit of each character is detected in the same manner set forth above for detecting the leading edge of the start bit 26. Once the leading edge of the start bit for a character is determined, the center sample is known because the number of samples in the start bit is known. Once the microprocessor 40 counts over from a start bit to the center sample, it can step between center samples of the bits in the character in byte increments.

In the preferred embodiment of the present invention, after finding the start bit for each character, the microprocessor 40 analyzes only one sample taken at the middle of each bit of the incoming signal to detect each bit in the "AT" prefix at step 90. The location of the center sample of each incoming bit is known because the length of a bit was calculated at step 88 and the bits in each character of the incoming signal are contiguous. If the "AT" prefix is successfully detected at step 90, step 96 is the next step in the program 70.

On the other hand, if the "AT" prefix, or other allowable prefix is not detected at step 90, an error has occurred because each command must be preceded by the "AT" characters. In this case, the next step in program 70 is step 94, wherein the modem 20 informs the DTE 10 that the command was not successfully received. Step 94 may entail dropping the carrier detect line or simply not sending an acknowledgment signal, as will be familiar to those skilled in the art. This failure will be recognized by the DTE 10, and the DTE 10 will resend the command.

Of course, the above procedure necessitates not writing over samples in a buffer 50a–h before the system finishes autobauding. The number and size of the buffers 50a–h set forth in the preferred embodiment are believed to accomplish this objective, but larger buffers or more buffers may be utilized if necessary.

Reading the characters in the command sequence after the "AT" pattern is detected is performed at step 96. If autobauding is successfully completed at step 90 (FIG. 4), the microprocessor 40 is able to find the start bit for each asynchronous character in the incoming signal and read the center sample of each incoming bit following receipt of the start bit to detect the incoming command characters.

The importance of having the sample clock signal on line 38 be an integer multiple of eight times all possible bit rates of the incoming signal is now detailed. The most stable place to sample a bit is in the center of the bit. This avoids transitions and accompanying jitter at the edges of bits.

In the preferred embodiment, the center sample of each start bit (start bit 26 in FIG. 2) for every character received is first located. Once the bit rate (autobauding) is determined at step 88 (FIG. 4) and the leading edge of a start bit is detected, the location of the center sample of the start bit is determined. Because the sample clock is an integer multiple of eight times the bit rate of the incoming signal, the center sample of each bit following the start bit in a character is an integer multiple of eight samples from the center sample of the start bit. The center sample of each bit in a character can therefore be determined by stepping through samples in byte increments, rather than analyzing each sample.

Described more specifically, FIG. 5 illustrates a timing diagram of sampling the incoming signal for the preferred embodiment of the present invention. The center sample 100a of start bit 26 is shown. The center sample 100a is found by counting a calculated number of samples over from the leading edge of the start bit 26, the calculated number being equal to the number of samples taken during the start bit 26 divided by two. Presuming that the transaction associated with the beginning of start bit 26 is located in bit position three, the center sample would therefore occupy bit position seven in a sample byte 102a (four bits over from bit three that contains the leading edge of start bit 26). Each sample byte 102a–n is one byte of samples taken in sampler circuit 42 and passed in parallel to RAM 50 (FIG. 3). Precisely because the sample clock signal on line 38 is an integer multiple of eight times the bit rate of the incoming signal, the center sample 100a–n for each bit in the first character in the incoming signal will be in the same position in sample bytes 102a–n an integer number of bytes apart. Likewise, for characters following the first character, such as the character "T," after finding the start bit and the center sample of the start bit for the character, the rest of the bits in the character can be determined by stepping through the character in sample byte 102a–n steps.

For example, in FIGS. 4 and 5, if eight samples are taken per bit in the incoming signal, bit position seven in each byte (a sample byte 102a–n) of samples will contain the center sample 100a–n of the bit in a character. A mask from register 61 is ANDed with each sample byte 102a–n to determine the value of each bit seven in every sample byte 102a–n. If sixteen samples were taken per bit in the incoming signal, bit seven in every other sample byte 102a–n would contain the center sample 100a–n. Thus, there is only a need to count bytes of samples, not bits of samples, to move between center samples 100a–n of bits in characters. The bits in characters in the command sequence, following finding the start bit and center sample for each character, are thus determined by analyzing one sample per bit and via byte manipulation at step 96.

Returning to FIG. 4, after detection of the "AT" prefix at step 90, the microprocessor 40 will generate the appropriate echo characters and result code through the output buffer 56 at step 96. Up until the stop bit after the "T" character is detected at step 90, the stored samples are simply output to the DTE 10 from the RAM 50 in the modem 20 (FIG. 3). Thus, the DTE 10 receives a reflection of the signal it outputs. After the character "T" is echoed, the reflected command sequence and the result code are generated by the microprocessor 40 running the program 70 at step 96.

The microprocessor 40 generates the command sequence and the result code under control of the program 70. Specifically, the microprocessor 40 knows the bit rate of the signal to be output. Therefore, producing appropriate signals involves generating long strings of ones and zeros to equal bits of a duration equal to the designated communication speed. The raising and lowering of a signal on communication path 14 by the microprocessor 40 via software control is familiar to those skilled in the art. The microprocessor 40 passes the signal to the DTE 10 over control bus 36 through the output buffer 56. The software needed to have the microprocessor 40 properly respond to the command sequence and produce appropriate result codes is familiar to those skilled in the art.

The command sequence is generated by the microprocessor 40, rather than echoed from RAM 50, to allow the microprocessor 40 to review the command characters. For example, a backspace command should not simply be echoed. Instead, the appropriate delete and backspace commands are generated and sent to the DTE 10.

The actual result codes that must be generated by the DTE 10 to acknowledge the receipt of a command are known. The code for producing the proper result codes and command sequence to be transmitted to the DTE are stored in ROM 41, and the bit rate of the result code is based on the speed at which the DTE 10 communicates with the modem 20.

After step 96, the modem 20 either will remain in command mode or will operate in on-line mode if the detected command was a command that causes a transition from on-line to command mode. If the modem 20 does not receive a command to go to on-line mode, the microprocessor 40 goes to step 72 and the program 70 is repeated. Alternatively, the modem 20 will enter on-line mode for data communications, and the modem 20 will operate in the conventional on-line mode using the UART 60 and RAM 64. As will be familiar to those skilled in the art, in the on-line mode data passing through the modem 20 to or from the DTE 10 is passed through the UART 60 and "back end" circuitry connected to communications path 16, which is not shown.

As set forth above, the microprocessor 40 controls the input buffer 26 to pass data to the sampler 42 or to the UART 60, and the output buffer 56 to accept data from either the UART 60 or RAM 50. Thus, the microprocessor 40 controls the input buffer 26 and output buffer 56 via control bus 36 to pass data through the UART 60 in on-line mode and to bypass the UART 60 in command mode.

Those skilled in the art will recognize that the memory devices set forth above may be of many different types (such as volatile or static) and from many manufacturers, as desired by the designer of the system. Likewise, the UART, buffers and microprocessor set forth above are preferred, but other makes and model devices may be utilized within the scope of the present invention. Indeed, the above-described and below claimed invention could be implemented using only hardware devices (no microprocessor), implementing a hardware logic state machine to perform the sequential detection and recognition functions required in the present invention. However, implementation of the present invention using a microprocessor running a program, as set forth above, allows for acceptable speed and a flexibility of operation not obtained in hardware devices.

The preferred embodiment of the present invention utilizes a microprocessor 40 running software to control the sample clock rate. However, as stated above, a finite state machine may be used to carry out aspects of the preferred embodiment of the present invention. The finite state machine would not employ a microprocessor running software to autobaud in the "software UART state." Instead, the finite state machine would continually sample the incoming signal, detect the autobauding prefix and command characters, and generate the proper output signals to the DTE 10 via discrete components. The sample rate would again be an integer multiple of eight times the possible bit rates. For example, a hardware counter could count the number of samples between transitions on the data line the demarcate the start bit, and the count could be provided to a divisor to divide down the sample clock signal. The divided sample clock signal would serve as the latch-in for data bits to a UART. The divided sample clock signal would latch the UART at the center sample of each bit in the incoming data. Thus, the term "software UART state" is not limited to implementation of the present invention for operating the modem 20 using only software.

Also, it will be apparent to those skilled in the art that sixteen or thirty-two samples could be taken into the sampler circuit 42, operated upon, and stored in RAM 50 in parallel within the scope of the present invention. Thus, the present invention could allow for use of sixteen or thirty-two bit-wide busses.

In view of the foregoing description of the preferred embodiment in its intended environment, other embodiments of the present invention will suggest themselves to those skilled in the art. Therefore, the scope of the present invention is to be limited only by the claims below and equivalents thereof.

I claim:

1. In a data communication system including data communication equipment receiving incoming command signals, said incoming command signals being provided by data terminal equipment at one of a plurality of data transfer rates, an incoming command signal comprising an autobauding prefix and a command character, the data communication equipment including a memory device, a microprocessor, and an output buffer for sending response signals to said data terminal equipment, a method for autobauding and processing incoming command signals, comprising the steps of:

(a) sampling said incoming command signal at a fixed sampling frequency being a predetermined integer multiple of the highest data transfer rate of said plurality of data transfer rates;

(b) storing said samples of said incoming command signal in bytes in said memory device;

(c) transferring said samples of said incoming command signal directly from said memory device to said output buffer until at least a portion of said command character is detected;

(d) autobauding in response to receipt of said autobauding prefix;

(e) detecting the occurrence of each bit of the command character following said autobauding prefix by analyzing a center sample, in said memory device, of each bit in the command character and locating each subsequent bit by moving between said center samples in byte increments;

(f) generating a response signal corresponding to said incoming command signal containing said detected command character; and (g) transferring said response signal from the microprocessor to said data terminal equipment directly through said output buffer;

wherein said steps (a) through (e) are performed for a subsequent incoming command signal having a first data transfer rate before completion of operations (f) and (g) for a prior incoming command signal having a second data transfer rate, said second data transfer rate being different than said first data transfer rate.

2. A data communication equipment for receiving an incoming command signal, said incoming command signal being provided by data terminal equipment at one of a plurality of data transfer rates, said incoming command signal comprising an autobauding prefix and a command character, said data communication equipment comprising:

a high speed clock generating a sample clock signal, said sample clock signal having a fixed sampling frequency, said fixed sampling frequency being a predetermined integer multiple of the highest data transfer rate of said plurality of data transfer rates;

sampling means responsive to said sample clock signal for taking samples of said incoming command signal;

a memory device for storing said samples of said incoming command signal;

a microprocessor, controlling said data communication equipment, and operating to:

(a) transfer said samples of said incoming command signal from said sampling means to said memory device;

(b) inspect said samples of said incoming command signal to detect a first predetermined transition of said incoming command signal;

(c) inspect said samples of said incoming command signal to detect a second predetermined transition of said incoming command signal;

(d) determine the number of samples of said incoming command signal between said first predetermined transition and said second predetermined transition;

(e) determine the data transfer rate of said incoming command signal based upon said number of samples;

(f) detect the occurrence of said autobauding prefix in said incoming command signal;

(g) autobaud at said determined data transfer rate in response to detection of said autobauding prefix;

(h) after detecting said autobauding prefix, detect the occurrence of said command character; and (i) generate a response signal corresponding to said incoming command signal containing said detected command character;

wherein said microprocessor operates said data communication equipment in a single state while in command mode such that said microprocessor performs operations (a) through (g) for a current said command character having a first data transfer rate before said microprocessor has completed operations (h) and (i) for a previous said command character having a second data transfer rate, said second data transfer rate being different than said first data transfer rate.

3. A data communication equipment for receiving an incoming command signal, said incoming command signal being provided by data terminal equipment at one of a plurality of data transfer rates, said incoming command signal comprising an autobauding prefix and a command character, said data communication equipment comprising:

a high speed clock generating a sample clock signal, said sample clock signal having a fixed sampling frequency, said fixed sampling frequency being a predetermined integer multiple of the highest data transfer rate of said plurality of data transfer rates;

sampling means responsive to said sample clock signal for taking samples of said incoming command signal;

a memory device for storing said samples of said incoming command signal;

a microprocessor, controlling said data communication equipment, and operating to:

(a) transfer said samples of said incoming command signal from said sampling means to said memory device;

(b) inspect said samples of said incoming command signal to detect a first predetermined transition of said incoming command signal;

(c) inspect said samples of said incoming command signal to detect a second predetermined transition of said incoming command signal;

(d) determine the number of samples of said incoming command signal between said first predetermined transition and said second predetermined transition;

(e) determine the data transfer rate of said incoming command signal based upon said number of samples;

(f) detect the occurrence of said autobauding prefix in said incoming command signal;

(g) autobaud at said determined data transfer rate in response to detection of said autobauding prefix;

(h) after detecting said autobauding prefix, detect the occurrence of said command character; and (i) generate a response signal corresponding to said incoming command signal containing said detected command character;

wherein said microprocessor operates said data communication equipment to perform operations (a) through (g) for a subsequent incoming command signal having a first data transfer rate before completing operations (h) and (i) for a prior incoming command signal having a second data transfer rate, said second data transfer rate being different than said first data transfer rate.

4. In a data communication system including data communication equipment receiving incoming command signals provided by data terminal equipment, said incoming command signal being provided by said data terminal equipment at one of a plurality of data transfer rates, a said incoming command signal comprising an autobaud prefix and a command character, a method for autobauding by said data communication equipment, said method comprising the steps of:

(a) receiving said incoming command signal;

(b) sampling said incoming command signal at a fixed sampling frequency to provide samples of said incoming command signal, said fixed sampling frequency being a predetermined integer multiple of the highest data transfer rate of said plurality of data transfer rates;

(c) storing said samples of said incoming command signal in a memory device;

(d) inspecting said samples of said incoming command signal to detect a first predetermined transition of said incoming command signal;

(e) inspecting said samples of said incoming command signal to detect a second predetermined transition of said incoming command signal;

(f) determining the number of samples of said incoming command signal between said first predetermined transition and said second predetermined transition;

(g) determining the data transfer rate of said incoming command signal based upon said number of samples;

(h) detecting the occurrence of said autobaud prefix in said incoming command signal;

(i) autobauding at said determined data transfer rate in response to said detected autobaud prefix;

(j) after detecting said autobaud prefix, detecting the occurrence of said command character in said incoming command signal; and (k) generating a response signal corresponding to said incoming command signal containing said detected command character;

wherein said steps (a) through (i) are performed for a subsequent incoming command signal having a first data transfer rate before completion of operations (j) and (k) for a prior incoming command signal having a second data transfer rate, said second data transfer rate being different than said first data transfer rate.

* * * * *